United States Patent
Wood et al.

(10) Patent No.: US 8,137,057 B2
(45) Date of Patent: *Mar. 20, 2012

(54) ENGINE INTAKE AIR COMPRESSOR AND METHOD

(75) Inventors: Terry G. Wood, Countryside, IL (US); Elias P. Soupos, Chicago, IL (US)

(73) Assignee: International Engine Entellectual Property Company, LLC, Lisle, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/710,558

(22) Filed: Feb. 23, 2010

(65) Prior Publication Data

US 2010/0150698 A1 Jun. 17, 2010

Related U.S. Application Data

(63) Continuation of application No. 11/438,249, filed on May 22, 2006, now Pat. No. 7,698,894.

(51) Int. Cl.
F04D 29/44 (2006.01)
(52) U.S. Cl. ......... 415/116; 415/183; 416/183; 416/228
(58) Field of Classification Search ................ 415/56.5, 415/57.1, 57.4, 58.5, 58.7, 116, 144, 183; 416/183, 175, 228
See application file for complete search history.

(56) References Cited

U.S. PATENT DOCUMENTS

| | | | | |
|---|---|---|---|---|
| 3,235,233 A * | 2/1966 | Bolton | ......................... | 416/188 |
| 3,462,071 A * | 8/1969 | Garve | ......................... | 415/116 |
| 4,696,165 A * | 9/1987 | Bucher | ......................... | 60/609 |
| 5,333,990 A * | 8/1994 | Foerster et al. | ............... | 415/58.4 |
| 5,806,308 A * | 9/1998 | Khair et al. | ...................... | 60/278 |
| 6,435,828 B1 * | 8/2002 | Bostwick | ....................... | 416/175 |
| 6,463,907 B1 * | 10/2002 | Hiltner | ......................... | 123/304 |
| 6,629,818 B2 * | 10/2003 | Svoboda | .................... | 415/121.1 |
| 6,648,594 B1 * | 11/2003 | Horner et al. | ................. | 415/145 |
| 6,648,602 B2 * | 11/2003 | Horng et al. | ................. | 416/203 |
| 6,945,748 B2 * | 9/2005 | Svihla et al. | ................. | 415/58.4 |
| 7,229,243 B2 * | 6/2007 | Nikpour et al. | .............. | 415/57.1 |
| 7,575,411 B2 * | 8/2009 | Wood | ........................... | 415/58.4 |
| 2005/0002782 A1 * | 1/2005 | Nikpour et al. | ............ | 415/208.1 |
| 2007/0269308 A1 * | 11/2007 | Wood | ........................... | 415/57.1 |

FOREIGN PATENT DOCUMENTS

GB 2166800 A * 5/1986

* cited by examiner

*Primary Examiner* — Edward Look
*Assistant Examiner* — Aaron R Eastman
(74) *Attorney, Agent, or Firm* — Mark C. Bach; Jeffrey P. Calfa

(57) ABSTRACT

A compressor assembly (304) includes a compressor housing (312) having a main air inlet (324) and an annular wall (328) defining an inducer bore (325). A secondary inlet passage (322) is disposed around the inducer bore (325). The secondary inlet passage (322) has an inlet slot (320) operatively intersecting the inducer bore (325) to permit the entry of a fluid thereinto through an inlet port (327). The inlet slot (320) advantageously defines an augmented inducer diameter region (331). Preferably the secondary inlet passage (322) may be selectively partially or completely isolated from the main air inlet (324). A compressor wheel (318) is located in the compressor housing (312) and has a stepped portion (330) formed by at least one plurality of vanes (238) operatively associated with the augmented inducer diameter region (331) adjacent to the inlet slot (320) of the housing (312) to receive fluid therefrom.

10 Claims, 7 Drawing Sheets

ENGINE INTAKE AIR COMPRESSOR AND METHOD

FIELD OF THE INVENTION

This invention relates to intake air compressors, such as turbochargers or superchargers, for internal combustion engines.

BACKGROUND OF THE INVENTION

Engines having compressors for intake air, such as turbochargers or superchargers are well known. Engine systems employing fluid input paths upstream of a compressor inlet are also known.

There have been many attempts to optimize the air management function of an engine that includes more than air intake and exhaust paths. An engine may include associated flow circuits, for example, exhaust gas recirculation, crankcase breather, electronics cooling, or other flow circuits that may be connected between an engine location and an inlet to a compressor or supercharger.

One main disadvantage of the known engine configurations is their ability to draw an adequate amount of fluid into the compressor. Another disadvantage is a loss of pressure in an intake passage connected to an inlet of a compressor resulting from the connection of the other flow circuits.

Accordingly, there is a need for an improvement to existing engine configurations that allows for a more efficient and advantageous use of secondary fluids introduced at an inlet of a compressor.

SUMMARY OF THE INVENTION

A compressor assembly includes a compressor housing having a main air inlet and an annular wall defining an inducer bore. A secondary inlet passage is disposed around the inducer bore. The secondary inlet passage has an inlet slot operatively intersecting the inducer bore to permit the entry of a fluid thereinto through an inlet port. The inlet slot advantageously defines an augmented inducer diameter region. Preferably the secondary inlet passage may be selectively partially or completely isolated from the main air inlet. A compressor wheel is located in the compressor housing and has a stepped portion formed by at least one plurality of vanes operatively associated with the augmented inducer diameter region adjacent to the inlet slot of the housing to receive fluid therefrom.

An internal combustion engine includes a crankcase having an internal cavity, an intake manifold connected to the crankcase, an exhaust manifold connected to the crankcase, and a supercharger having a compressor. The compressor is connected to the intake manifold and includes a compressor housing having a main air inlet and an annular wall defining an inducer bore, and a secondary inlet passage located around the inducer bore. The secondary inlet passage has an inlet slot operatively intersecting the inducer bore to permit the entry of a fluid thereinto through an inlet port and defines an augmented inducer diameter region. The engine may also include an EGR passage fluidly connecting the secondary inlet passage with a low pressure exhaust source, a crankcase ventilation passage fluidly connecting the secondary inlet passage with the internal cavity, and/or a separate air inlet passage fluidly connecting the secondary inlet passage selectively with the low pressure intake passage.

A method of operating an internal combustion engine includes the step of compressing a flow of air in a compressor to yield an intake flow. The intake flow is combusted in an engine to yield an exhaust flow, which is used to operate a turbine. A second fluid flow may be admitted into a secondary inlet of the compressor and mixed with the flow of air. The second fluid flow may be each of, or a combination of, exhaust gas, crankcase vapor, intake air, and so forth.

DESCRIPTION OF A PREFERRED EMBODIMENT

Figure 1:
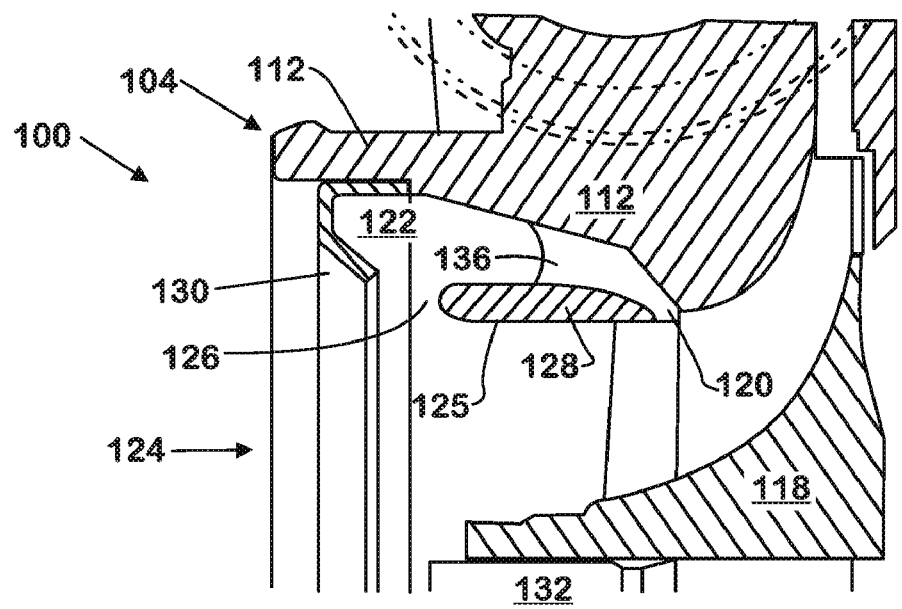
FIG. 1 is a cross-section view of an inlet region of a compressor showing an augmented inducer diameter in accordance with the invention.

The following describes an apparatus for and method of providing additional inputs for a compressor for use with an internal combustion engine. Although the invention is applicable to a mechanically-driven supercharger, this description is in the context of an exhaust-gas-driven turbocharger. An improved compressor 100 in accordance with the invention is shown in FIG. 1. The compressor 100 has a housing 112 enclosing a compressor wheel 118. The housing 112 in the area of the wheel 118 has features that enhance performance of the compressor 104. A secondary inducer slot 120 fluidly connects an inlet chamber 122 with an inducer bore 125. A ring slot 126 that fluidly connects the chamber 122 with the air intake 124 is formed between an inlet wall 128 and an inlet ring 130. The recirculation chamber 122 is separated from the main air intake 124 by the inlet wall 128. The inlet chamber 122 is the annular volume between the housing 112, the inlet wall 128 and the inlet ring 130.

The inlet wall 128 advantageously has an aerodynamic or airfoil cross-sectional shape within the inlet chamber 122. The recirculation chamber 122 may advantageously have an increasing cross-sectional flow area expanding in a generally axial direction from the inducer slot 120 toward the ring slot 126, to facilitate the flow of air from the ring slot 126 to the inducer slot 120 to when the compressor 104 operates in a region of the usable portion of the compressor map close to a choke condition. During operation of the compressor 104, the compressor wheel 118 rotates about a central axis of a shaft 132 within the housing 112. Air enters the compressor assembly 104 through the air intake 124 and enters the inducer bore 125.

When the compressor 104 operates in a region of the usable portion of the compressor map close to a choke condition, air enters the inlet chamber 122 through the ring slot 126 and drawn through the inducer slot 120 into the compressor wheel 118. In this regard, the aerodynamic or airfoil profile of the inlet wall 128 and the housing 112 within the inlet chamber 122 may advantageously be arranged to create a Coanda effect to minimize frictional effects on additional air that is entering the compressor through the inducer slot 120. The inducer slot 120 functions as an enlargement or augmentation of the inducer bore 125 when the compressor 104 operates close to a choke condition, by allowing an additional mass flow of air to access the compressor wheel 118. A secondary or augmented inducer bore or diameter region is thus created by the inducer slot 120 around the inducer bore 125. The augmented inducer diameter region cooperating with a larger effective diameter of the inducer portion of the compressor wheel 118 increases the effective flow area and allows additional flow of air to enter the compressor wheel 118 when the compressor 104 operates near a choke condition.

When the compressor 100 operates close to a surge condition, the inlet chamber 122 may advantageously reverse flow, with air entering the chamber 122 from the slot 120 and exiting through the ring slot 126, and recirculate a portion of air from the compressor wheel 118 back into the inducer bore 125. This recirculation is similar to a recirculation of a known compressor having a recirculation slot. The improved air flow into the compressor 100 may increase the capacity during operation of the compressor 100 in that region and may increase the speed of the air passing though the chamber thereby reducing the air pressure to enable more air to be pulled in from the inducer bore 125. Moreover, the aerodynamic shape of the wall 128 may be further augmented by the ring 130 which may advantageously protrude less into the bore 125 than other known rings installed into known compressor housings. The ring 130 may allow air from the volume 122 to enter the bore 125 through a large annular opening, the ring slot 126.

Figure 2:
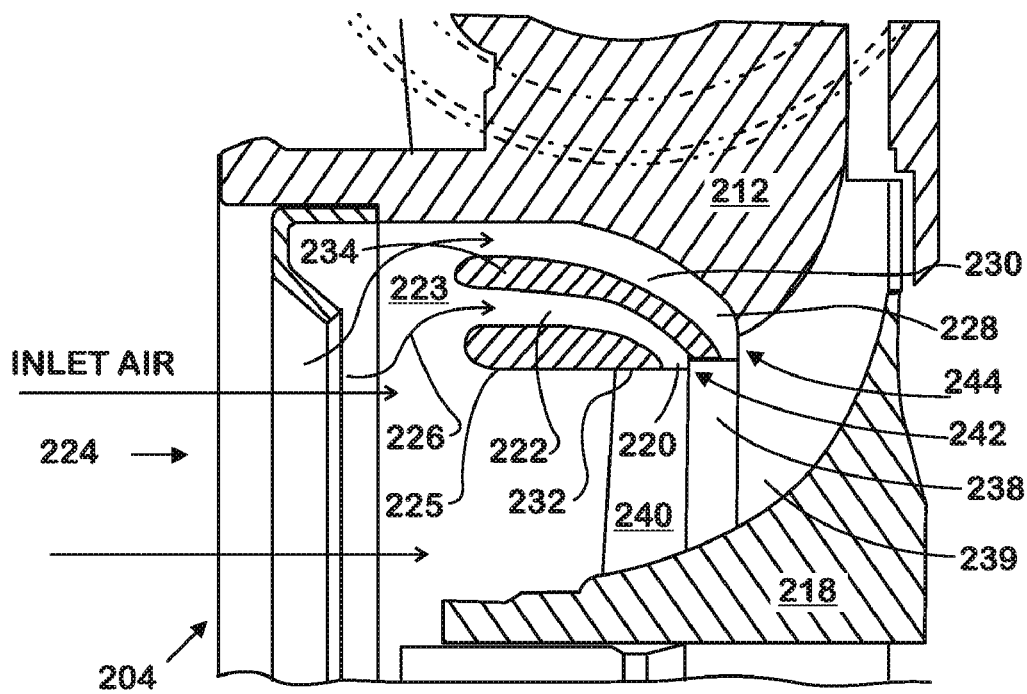
FIG. 2 is a cross-section of a compressor having two secondary inlet passages in accordance with an additional embodiment of the invention.

An alternate embodiment of a compressor 204 is shown in FIG. 2. The compressor 204 has a housing 212 enclosing a compressor wheel 218. The housing 212 in the area of the wheel 218 has features that provide additional inputs to the compressor 204. A first secondary inducer slot 220 fluidly connects a first secondary inlet passage 222 with a main secondary inlet chamber 223 and functions as an enlargement or augmentation of a main inducer bore 225 when the compressor 204 operates, by allowing an additional mass flow of air to access the compressor wheel 218. A ring slot 226 fluidly connects the chamber 223 with an air inlet 224. A second secondary inlet inducer slot 228 fluidly connects a second secondary inlet passage 230 with the main secondary inlet chamber 223 and functions as a still further enlargement or augmentation of the inducer bore 225 when the compressor 204 operates, by allowing an additional mass flow of air to access the compressor wheel 218. The second secondary inlet passage 230 is separated from the main inducer bore 225 by an inner wall 232. The first secondary inlet passage 222 is separated from the second secondary inlet passage 230 by an outer wall 234. A portion of the housing 212 forms an outer boundary for the first passage 222. Each of the first and second secondary inlet passages 222 and 230 may have a cross sectional flow area that is no less than the cross sectional flow area of either of the inducer slots 220 and 228.

The augmented inducer diameters formed respectively by the first inducer slot 220 and second inducer slot 228 cooperating with the respectively larger effective diameters 238 and 240 of an inducer portion of the compressor wheel 218 further increase the effective flow area of the compressor and allow an additional flow of air to enter the compressor wheel 218 respectively from the slot 220 primarily in the axial direction into a radial portion 241 of the augmented diameter portion 242 formed in the stepped portion 238, and from the slot 228 primarily in the axial direction into the radial portion of an augmented diameter portion 244 formed in a stepped portion 239 when the compressor 204 operates.

The compressor wheel 218 rotates within the housing 212 when the compressor 204 operates. Air enters the compressor 204 through the air inlet 224. Both the inner wall 232 and the outer wall 234 advantageously have an aerodynamic or airfoil cross-sectional shape to advantageously reduce the air pressure, reduce the frictional losses, and increase the speed of air passing though the first passage 222 and the second passage 230 during operation of the compressor 204, thereby pulling more air into the secondary inlet chamber 223 and increasing the flow capacity of the compressor. A representative flow of air into the compressor 204 through the main inlet bore 225, and the first and second secondary inlet passages 222 and 230 is denoted by solid-line arrows.

The compressor wheel 218 may include a first plurality of short vanes 238 and a second plurality of long vanes 240. A third plurality of shorter vanes 239 may be located behind the others. Each of the long vanes 240 may advantageously form the first stepped portion 242, and the second stepped portion 244. The first stepped portion 242 may be arranged to be adjacent to the first slot 220, and the second stepped portion 244 may be arranged to be adjacent to the second slot 228, when the wheel 218 is in the housing 212. Each of the stepped portions 242 and 244 may be a physical stepped portion from the vanes 240 or may alternatively be a difference in profile between the vanes 238 and 240, or another appropriate combination. A location of the stepped portion 242 may be downstream of a location of the leading edges of the long vanes 240, and a location of the second stepped portion 244 may be at a location downstream from the first stepped portion 242, the downstream direction defined as a direction of air entering the compressor 204 through the bore 225 during operation of the compressor 204.

Other alternative configurations may involve compressor wheels having either one plurality of vanes, in which case one or more stepped portions may be formed into the vanes. Alternatively, other compressor wheels may have two, three, or more pluralities of vanes. In such a case, stepped portions may be formed either into a plurality of vanes, between vane profiles of the different pluralities, or any combination of the above. Typical compressor wheels and housings may be made of metal. Some applications may require use of titanium as the metal making up the compressor wheel. Because of the relative difficulty in cutting compressor wheel vanes made of titanium, the stepped portions or recesses may be cast or otherwise formed into the compressor vane wheels during manufacturing, and may only be finished by a fine machining operation before they are installed into a compressor housing.

Figure 3:
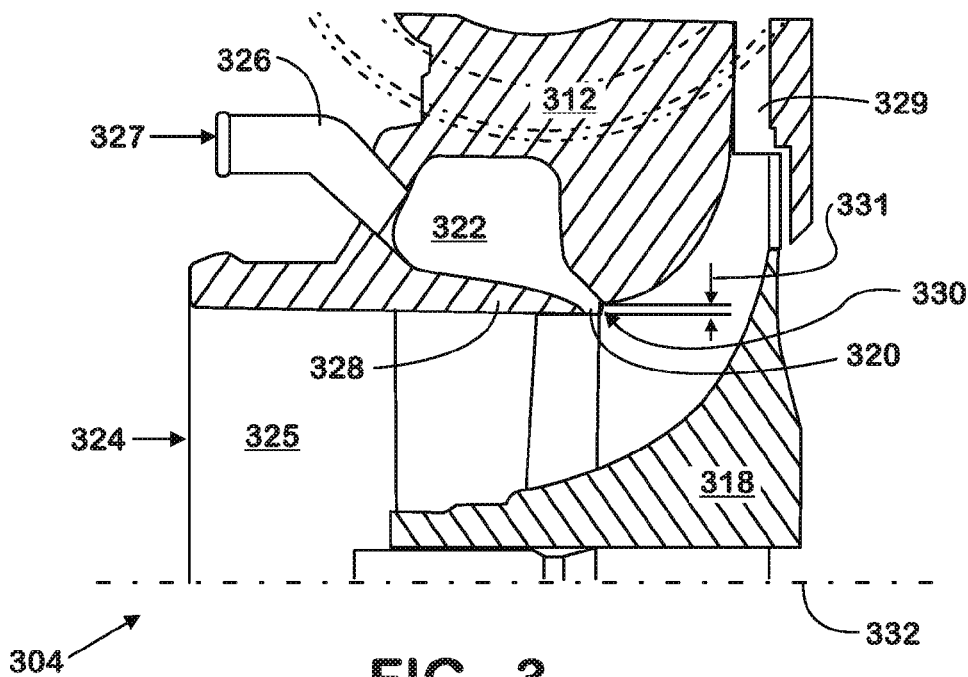
FIG. 3 is a cross-section view of an inlet region of a compressor showing an annular cavity with an angular entry condition around the inducer diameter in accordance with the invention.

An alternate embodiment of a compressor 304 is shown in cross section in FIG. 3. The compressor 304 has a housing 312 enclosing a compressor wheel 318. The housing 312 in the area of the wheel 318 has features that allow additional inlet paths to be connected to the compressor 304. A first inlet slot 320 fluidly connects a first annular cavity 322 and functions as an enlargement or augmentation of a main inlet or inducer bore 325 when the compressor 304 is in operation at almost any condition, by allowing an additional mass flow of a fluid to access a compressor wheel 318. An inlet port 326 fluidly connects the cavity 322 with other sources of fluid on an engine as will be discussed further. The inlet port 326 is shown as a tube having a bead formed thereon for connection to a hose (not shown), but any other connection configuration to a passage carrying the fluid that will occupy a portion of the cavity 322 during operation of the compressor 304 may be suitable.

The cavity 322 may advantageously extend substantially around an entire periphery of the main bore 325 so as not to introduce instabilities in the rotation of the wheel 318 due to asymmetrical entry of fluid from the cavity 322 into the wheel 318. Some applications, however, may be suitable for a cavity extending partially around the main bore 325 if, for example, a flow of fluid from the cavity 322 is low, or less than 15% of a rate of flow of air through the main bore 325, during operation of the compressor 304.

The cavity 322 is separated from a main air intake 324 passage by an inlet wall 328. The cavity 322 is the annular volume between the housing 312 and the inlet wall 328. The inlet wall 328 advantageously has an aerodynamic or airfoil cross-sectional shape within the cavity 322 to allow for smooth entry of the fluid in the cavity 322 into the slot 320. During operation of the compressor 304, the compressor wheel 318 rotates about a central axis of a shaft 332 within the housing 312. Air enters the compressor assembly 304 through the air intake 324 and enters the inducer bore 325. A fluid enters the compressor housing 312 through a second inlet 327. The fluid entering the second inlet 327 passes into the cavity 322 through the inlet port 326. From the cavity 322, the fluid passes through the slot 320 into the compressor wheel 318 where it may mix with air from the inlet bore 325. The mixture of air and the fluid is compressed and routed to an outlet passage 329 that may also be formed in the housing 312.

The wheel 318 may have a stepped portion 330 as described above, defining a segmented vane leading edge region 331 on the wheel 318 that is adjacent to the slot 320. The segmented leading edge region 331 may be oriented according to the orientation of vanes connected to the wheel 318 as described above. The orientation of the region 331 shown in FIG. 3 is substantially perpendicular, or, each of the leading edge segments defining the region 331 may lie on a planar, or in some instances a conical, surface that may form an acute angle with a centerline 332 of the bore 325. In this configuration, the vanes connected to the wheel 318 are pulling fluid into the compressor wheel in a direction that is substantially parallel to the centerline 332 of the bore 325, or, a direction of air entering the wheel 318 through the bore 325.

Figure 4:
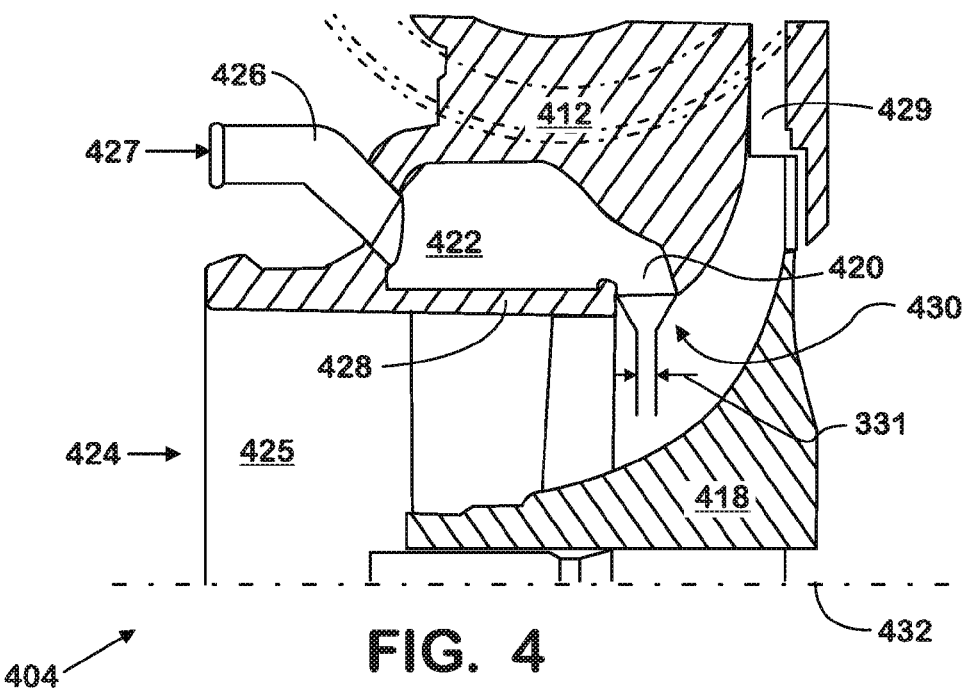
FIG. 4 is a cross-section view of an inlet region of a compressor showing an annular cavity with a radial entry condition around the inducer diameter in accordance with the invention.

An alternate embodiment of a compressor 404 is shown in cross section in FIG. 4. The compressor 404 has a housing 412 enclosing a compressor wheel 418. The housing 412 in the area of the wheel 418 has features that allow additional inlet paths to be connected to the compressor 404. A first inlet slot 420 fluidly connects a first annular cavity 422 and functions as an enlargement or augmentation of a main inlet or inducer bore 425 when the compressor 404 is in operation at almost any condition, by allowing an additional mass flow of a fluid to access a compressor wheel 418. An inlet port 426 fluidly connects the cavity 422 with other sources of fluid on an engine as will be discussed further. The inlet port 426 is shown as a tube having a bead formed thereon for connection to a hose (not shown), but any other connection configuration to a passage carrying the fluid that will occupy a portion of the cavity 422 during operation of the compressor 404 may be suitable.

The cavity 422 is separated from a main air intake 424 passage by an inlet wall 428. The cavity 422 is the annular volume between the housing 412 and the inlet wall 428. The inlet wall 428 advantageously has an aerodynamic or airfoil cross-sectional shape within the cavity 422 to allow for smooth entry of the fluid in the cavity 422 into the slot 420. During operation of the compressor 404, the compressor wheel 418 rotates about a central axis of a shaft 432 within the housing 412. Air enters the compressor assembly 404 through the air intake 424 and enters the inducer bore 425. A fluid enters the compressor housing 412 through a second inlet 427. The fluid entering the second inlet 427 passes into the cavity 422 through the inlet port 426. From the cavity 422, the fluid passes through the slot 420 into the compressor wheel 418 where it may mix with air from the inlet bore 425. The mixture of air and the fluid is compressed and routed to an outlet passage 429 that may also be formed in the housing 412.

The wheel 418 may have a stepped portion 430 as described above, defining a segmented vane leading edge region 431 on the wheel 418 that is adjacent to the slot 420. The segmented leading edge region 431 may be oriented at an angle with respect to the orientation of the leading edges of the vanes connected to the wheel 418. The orientation of the region 431 shown in FIG. 4 is substantially parallel, or, each of the leading edge segments defining the region 431 may lie on a cylindrical, or in some instances a conical, surface that may form an obtuse angle with a centerline 432 of the bore 425. In this configuration, the vanes connected to the wheel 418 are pulling fluid into the compressor wheel in a direction that is substantially perpendicular or along a radial direction toward the centerline 432 of the bore 425.

The embodiments shown in FIGS. 1 and 2 are advantageously suited for extending a functional map for compressors 104 and 204. The secondary inlet slots 126 and 226 are in fluid communication with each main inlet bore 125 and 225 respectively, and allow for additional air ingestion in each compressor wheel 118 and 218. In contrast, the embodiments shown in FIGS. 3 and 4 are advantageously suited for allowing additional fluids to be drawn into each compressor 304 and 404. These compressors 304 and 404 are well suited to serve as inlets of fluids other than air from each main inlet bore 325 and 425. It may be advantageous, however, to combine the benefits of extending a functional range of a compressor while still allowing for input of an additional fluid stream into a compressor wheel. One such embodiment is described below.

Figure 5:
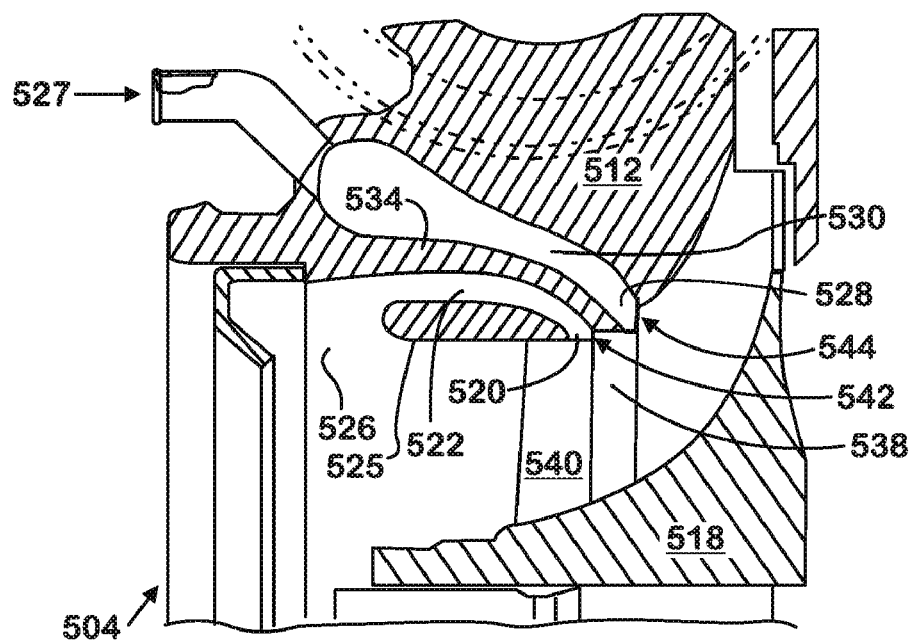
FIG. 5 is a cross-section of a compressor having two secondary inlet passages, one internal to the compressor and one external to the compressor, in accordance with an additional embodiment of the invention.

An alternative embodiment of a compressor 504 is shown in FIG. 5. The compressor 504 has a housing 512 enclosing a compressor wheel 518. The housing 512 in the area of the wheel 518 has features that provide additional inputs to the compressor 504. A first secondary inducer slot 520 fluidly connects a first secondary inlet passage 522 with a secondary inlet slot 526 and functions as an enlargement or augmentation of a main inducer bore 525 when the compressor 504 operates, by allowing an additional mass flow of air to access the compressor wheel 518. A second secondary inlet inducer slot 528 fluidly connects a second secondary inlet passage 530 with a secondary inlet port 527 and functions as a still further enlargement or augmentation of the inducer bore 525 when the compressor 504 operates, by allowing an additional mass flow of a fluid to access the compressor wheel 518. The first secondary inlet passage 522 is separated from the second secondary inlet passage 530 by a wall 534. A portion of the housing 512 forms an outer boundary for the first passage 522. Each of the first and second secondary inlet passages 522 and 530 may have a cross sectional flow area that is no less than the cross sectional flow area of either of the inducer slots 520 and 528.

The augmented inducer diameters formed respectively by the first inducer slot 520 and second inducer slot 528 cooperating with the respectively larger effective diameters 538 and 540 of an inducer portion of the compressor wheel 518 further increase the effective flow area of the compressor and allow an additional flow of air to enter the compressor wheel 518 respectively from the slot 520 and from the slot 528 when the compressor 504 operates. A flow entering the compressor wheel 518 through the slot 520 may advantageously be a portion of air from the main inducer bore 525, and a fluid entering the compressor wheel 518 through the slot 528 may advantageously be a fluid entering the compressor 504 through the second inlet 527. The compressor wheel 518 may advantageously include a first plurality of short vanes 538 and a second plurality of long vanes 540 that form a first stepped portion 542 and a second stepped portion 544 as discussed above.

Figure 6:
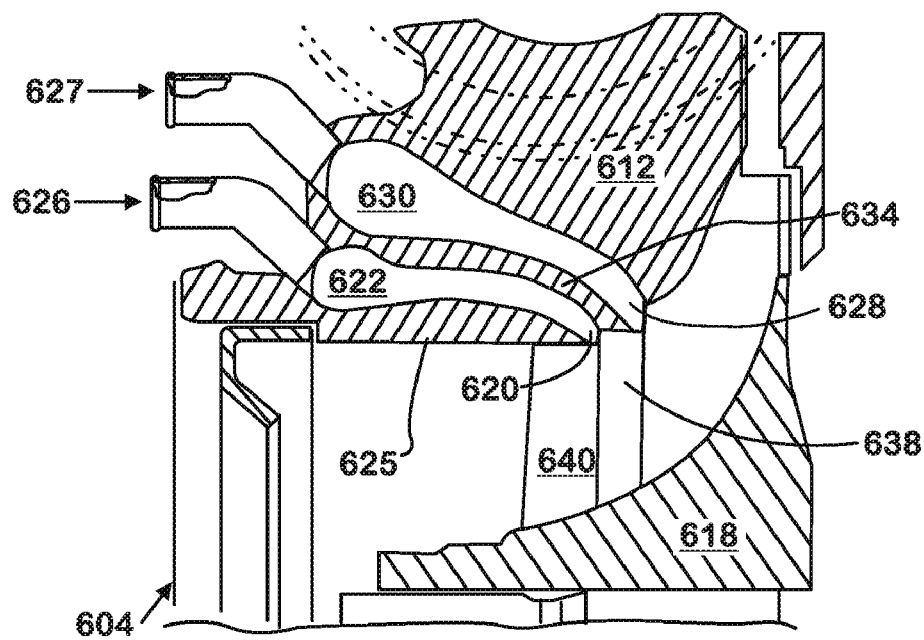
FIG. 6 is a cross-section of a compressor having two external secondary inlet passages in accordance with an additional embodiment of the invention.

An alternative embodiment of a compressor 604 is shown in FIG. 6. The compressor 604 has a housing 612 enclosing a compressor wheel 618. The housing 612 in the area of the wheel 618 has features that provide additional inputs to the compressor 604. A first secondary inducer slot 620 fluidly connects a first secondary inlet passage 622 with a secondary inlet port 626 and functions as an enlargement or augmentation of a main inducer bore 625 when the compressor 604 operates, by allowing an additional mass flow of a fluid entering the compressor 604 through the port 626 to access the compressor wheel 618. A second secondary inlet inducer slot 628 fluidly connects a second secondary inlet passage 630 with a secondary inlet port 627 and functions as a still further enlargement or augmentation of the inducer bore 625 when the compressor 604 operates, by allowing an additional mass flow of a fluid entering the compressor 604 through the port 627 to access the compressor wheel 618. The first secondary inlet passage 622 is separated from the second secondary inlet passage 630 by a wall 634. Each of the first and second secondary inlet passages 622 and 630 may have a cross sectional flow area that is no less than the cross sectional flow area of either of the inducer slots 620 and 628.

The augmented inducer diameters formed respectively by the first inducer slot 620 and second inducer slot 628 cooperating with the respectively larger effective diameters 638 and 640 of an inducer portion of the compressor wheel 618 further increase the effective flow area of the compressor and allow an additional flow of air to enter the compressor wheel 618 respectively from the slot 620 and from the slot 628 when the compressor 604 operates. A flow entering the compressor wheel 618 through the slot 620 may advantageously be a fluid entering the compressor 604 through the second inlet 626, and a fluid entering the compressor wheel 618 through the slot 628 may advantageously be a fluid entering the compressor 604 through the second inlet 627. The compressor 604 may advantageously accommodate two secondary inlet paths of fluids through the ports 626 and 627 that are separate from an air flow entering through the main inducer bore 625.

Figure 7:
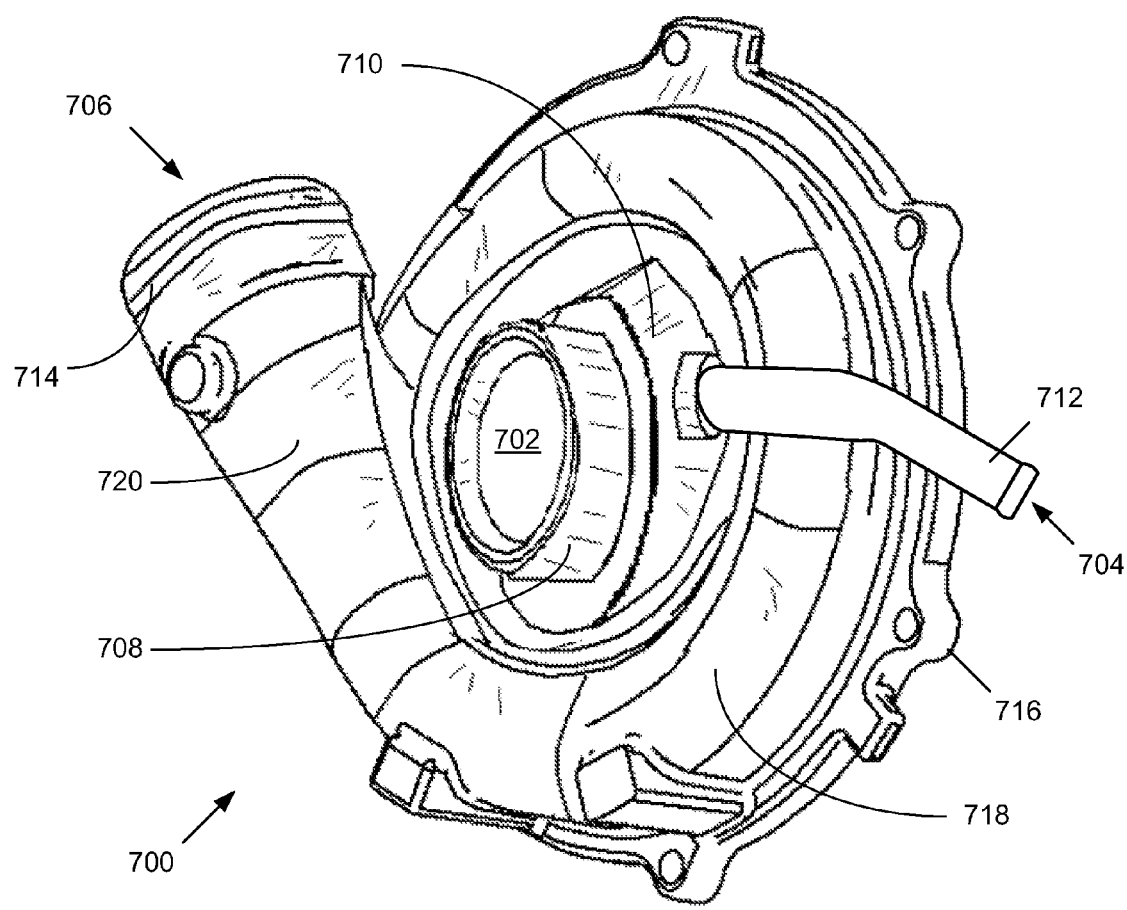
FIG. 7 is an outline view of a compressor housing having a second inlet in accordance with the invention.

An outline view of a compressor housing 700 having multiple inlets is shown in FIG. 7. The compressor housing 700 has a main inlet 702, a secondary inlet 704, and an outlet 706. The main inlet 702 communicates with a main bore (not shown) as described above, and may have a peripheral surface 708 for attachment of other engine components. The secondary inlet 704 may be isolated from the main inlet to communicate independently with an annular cavity 710 that surrounds the main bore and may advantageously be placed such that it does not significantly interfere with the interface surface 708 to allow for easy assembly of other engine components to the compressor housing 700. The inlet 704 may be fluidly connected to the cavity 710 through a passage 712. The passage 712 shown here is a tube, preferably made of steel, that has been inserted into an opening of the housing 700 by use of a press fitting or brazing operation. Other types of known passages for communication of fluids, as well as other methods of connections to the housing 700 may advantageously be used, for example, a direct connection of another engine component to the housing 700 and the cavity 710 through an opening in the housing 700 that fluidly communicates with the cavity 710.

The outlet 706 may be surrounded by an outlet interface surface 714 that enables connection of the housing 700 to other engine or vehicle components. The housing 700 may have a mounting flange 716 positioned peripherally on one end, the flange 716 having a plurality of bolt holes for connection to a back-plate (not shown). Other connection configurations between a compressor housing and a back plate or another similar component may advantageously be used. The inlet 702, secondary inlet 704, and outlet 706 may be in fluid communication to each other through a compressor wheel (not shown). A compressor scroll 718 and an outlet nozzle 720 may compress, decelerate, and transfer fluids from the compressor wheel to the outlet 706 when the compressor housing 700 is connected to a turbocharger (not shown), and the turbocharger is in operation.

Figure 8:
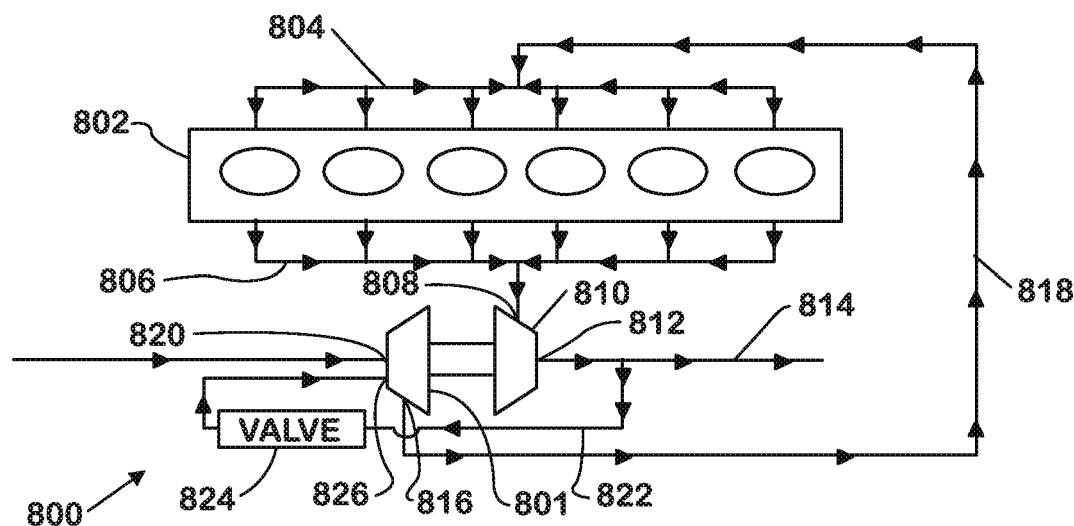
FIG. 8 is a block diagram of an engine having a low pressure EGR system connected to an additional inlet of a compressor in accordance with the invention.

A block diagram for an engine 800 having a compressor 801 in accordance with the invention is shown in FIG. 8. The engine 800 includes a crankcase 802 connected to an intake manifold 804 and an exhaust manifold 806. Other engine components may be connected to the engine 800 but are not shown for the sake of clarity. The exhaust manifold 806 is connected to an inlet 808 of a turbine 810. The turbine 810 may have an outlet 812 connected to a low pressure exhaust passage 814. The intake manifold 804 is connected to an outlet 816 of the compressor 801 through an intake passage 818. The compressor 801 is connected to the turbine 810 as is known. The compressor 801 has a main inlet 820 that may be connected to other engine components, for example an air-filter (not shown).

During operation of the engine 800, air may enter the compressor 801 through the main inlet 820. The air may be compressed in the compressor 801, exit the compressor 801 through the outlet 816, and be carried to the intake manifold 804. Air from the intake manifold 804 may combust in the crankcase 802, exit the crankcase 802, and be collected in the exhaust manifold 806 from where it may be routed to the turbine 810. While passing through the turbine 810, the air (now exhaust gas) may transfer energy to the turbine 810 to operate the compressor 801 before exiting through the outlet 812 into the passage 814.

A low pressure (LP) exhaust gas recirculation (EGR) passage 822 that includes an EGR valve 824 may fluidly connect the outlet 812 of the turbine 810 with a secondary inlet 826 of the compressor 801. The secondary inlet 826 of the compressor 801 may be arranged to ingest exhaust gas from the passage 814 when the engine 800 is operating and while the EGR valve 824 is at least partially open. Exhaust gas ingested through the secondary inlet 826 may advantageously be compressed and mixed in the compressor 801 with air coming into the engine 800 through the main inlet 820 of the compressor 801 to form a mixture. The mixture may be then routed to the intake manifold 804 as described above.

Connection of the EGR passage 822 to the secondary inlet 826 of the compressor 801 is advantageous because an additional driving force that pulls exhaust gas from the passage 822 into the compressor may be achieved. The additional driving force may increase as a speed of the compressor wheel (not shown) in the compressor 801 increases, thus making the engine 800 capable of drawing an adequate amount of exhaust gas under conditions of high engine speed and/or load. Moreover, at times when exhaust gas recirculation through the passage 822 is not desired, the EGR valve 824 may be closed. When the EGR valve 824 is closed, the compressor 801 may draw a large portion of any exhaust gas remaining between the secondary inlet 826 and the EGR valve 824 in the passage 822, effectively creating a vacuum. The vacuum created at the secondary inlet 826 may advantageously not consume any work input to the compressor 801 by the turbine 810, approximating a condition of operation for the compressor 801 that is similar to a condition of a known compressor that does not have a secondary inlet.

Figure 9:
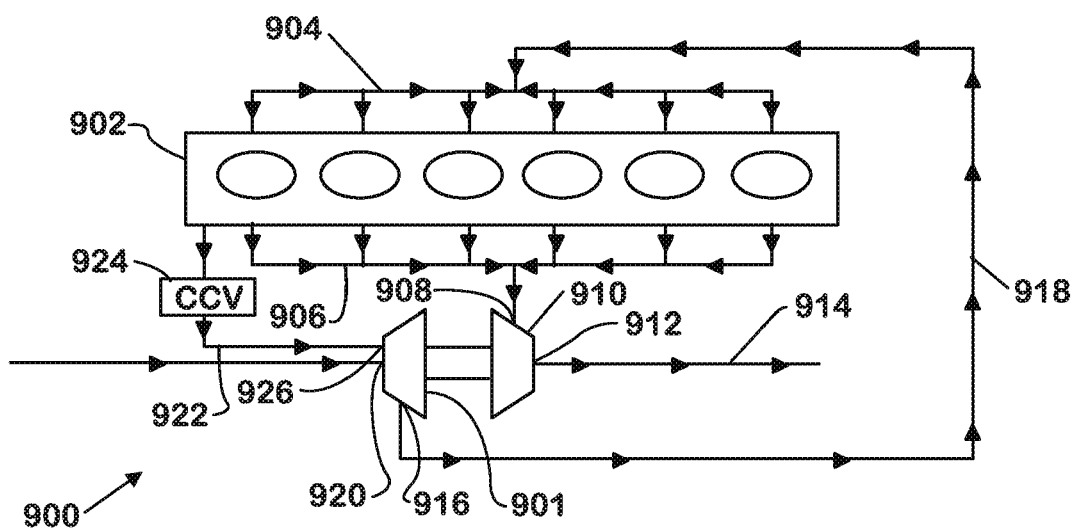
FIG. 9 is a block diagram of an engine having a closed crankcase ventilation system connected to an additional inlet of a compressor in accordance with the invention.

A block diagram for an engine 900 having a compressor 901 in accordance with the invention is shown in FIG. 9. The engine 900 includes a crankcase 902 connected to an intake manifold 904 and an exhaust manifold 906. Other engine components may be connected to the engine 900 but are not shown for the sake of clarity. The exhaust manifold 906 is connected to an inlet 908 of a turbine 910. The turbine 910 may have an outlet 912 connected to a low pressure exhaust passage 914. The intake manifold 904 is connected to an outlet 916 of the compressor 901 through an intake passage 918. The compressor 901 is connected to the turbine 910 as is known. The compressor 901 has a main inlet 920 that may be connected to other engine components, for example an air-filter (not shown).

A closed-crankcase-ventilation (CCV) passage 922 that includes a CCV valve 924 may fluidly connect an internal cavity of the crankcase 902 with a secondary inlet 926 of the compressor 901. The secondary inlet 926 of the compressor 901 may be arranged to ingest crankcase vapors from the crankcase 902 when the engine 900 is operating and while the CCV valve 924 is at least partially open. Crankcase vapors ingested through the secondary inlet 926 may advantageously be compressed and mixed in the compressor 901 with air coming into the engine 900 through the main inlet 920 of the compressor 901 to form a mixture. The mixture may be then routed to the intake manifold 904 as described above.

Connection of the CCV passage 922 to the secondary inlet 926 of the compressor 901 is advantageous because an additional driving force that pulls crankcase vapors from the passage 922, downstream of the CCV valve 924 into the compressor may be achieved. The additional driving force may increase as a speed of the compressor wheel (not shown) in the compressor 901 increases, thus making the engine 900 capable of drawing an adequate amount of vapors under conditions of high engine speed and/or load, and not allowing liquid oil to potentially accumulate at any low points of the passage 922. Moreover, at times vapor circulation through the passage 922 is not desired, or a pressure in the internal cavity of the crankcase 902 is below a maximum desired pressure, the CCV valve 924 may be closed.

Figure 10:
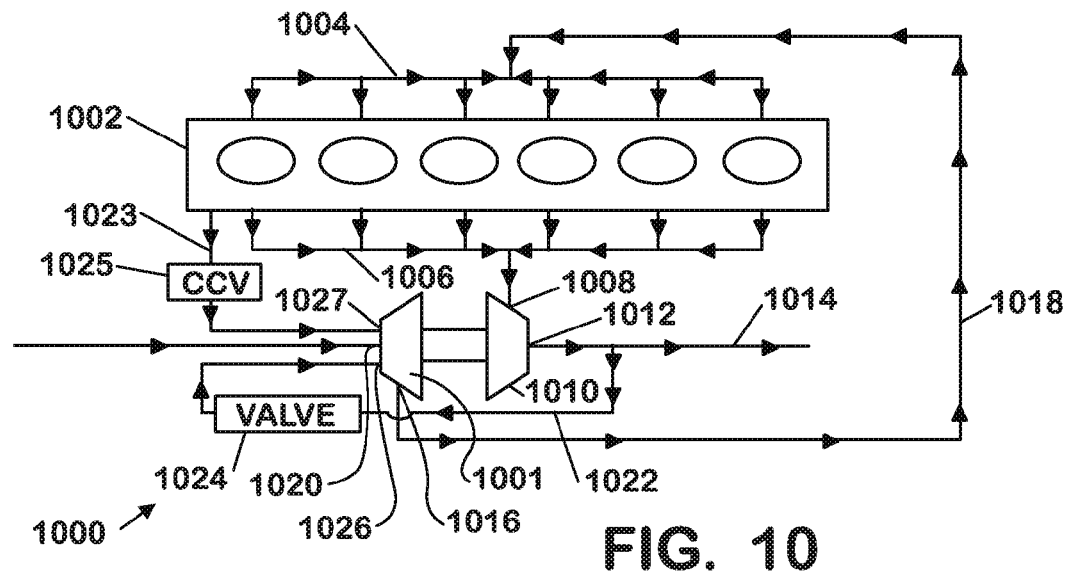
FIG. 10 is a block diagram of an engine having a closed crankcase ventilation system and a low pressure EGR system, each connected to a separate additional inlet of a compressor in accordance with the invention.

A block diagram for an engine 1000 having a compressor 1001 in accordance with the invention is shown in FIG. 10. The engine 1000 includes a crankcase 1002 connected to an intake manifold 1004 and an exhaust manifold 1006. Other engine components may be connected to the engine 1000 but are not shown for the sake of clarity. The exhaust manifold 1006 is connected to an inlet 1008 of a turbine 1010. The turbine 1010 may have an outlet 1012 connected to a low pressure exhaust passage 1014. The intake manifold 1004 is connected to an outlet 1016 of the compressor 1001 through an intake passage 1018. The compressor 1001 is connected to the turbine 1010 as is known. The compressor 1001 has a main inlet 1020 that may be connected to other engine components, for example an air-filter (not shown).

A low pressure (LP) exhaust gas recirculation (EGR) passage 1022 that includes an EGR valve 1024 may fluidly connect the outlet 1012 of the turbine 1010 with a first secondary inlet 1026 of the compressor 1001. The first secondary inlet 1026 of the compressor 1001 may be arranged to ingest exhaust gas from the passage 1014 when the engine 1000 is operating and while the EGR valve 1024 is at least partially open. Exhaust gas ingested through the first secondary inlet 1026 may advantageously be compressed and mixed in the compressor 1001 with air coming into the engine 1000 through the main inlet 1020 of the compressor 1001 to form a mixture. The mixture may be then routed to the intake manifold 1004 as described above.

A closed crankcase ventilation (CCV) passage 1023 that includes a CCV valve 1025 may fluidly connect an internal cavity of the crankcase 1002 with a second secondary inlet 1027 of the compressor 1001. The second secondary inlet 1027 of the compressor 1001 may be arranged to ingest crankcase vapors from the crankcase 1002 when the engine 1000 is operating and while the CCV valve 1025 is at least partially open. Crankcase vapors ingested through the second secondary inlet 1027 may advantageously be compressed and mixed in the compressor 1001 with air coming into the engine 1000 through the main inlet 1020 of the compressor 1001 to form a mixture. The mixture may be then routed to the intake manifold 1004 as described above.

Connection of the EGR passage 1022 to the first secondary inlet 1026 and of the CCV passage 1023 to the second secondary inlet 1027 of the compressor 1001 is advantageous because an additional driving force for each may be used to pull exhaust gas and crankcase vapors into the compressor 1001. Traditional methods of introducing fluids such as these at an upstream location with respect to a compressor inlet are both not as effective in pulling fluids into the compressor, and often introduce pressure restrictions in compressor inlets. Any reductions in pressure restrictions on engine air passages advantageously improve an engine's operating efficiency.

An additional advantage of having a compressor with secondary inlets includes using at least one secondary inlet to circulate cooled compressed air from an intake manifold through an engine component for convective cooling of that component. Air from an intake manifold, or any passage fluidly connected thereto, may be pulled by the secondary inlet of the compressor through the engine component. Heated air from the engine component may be then advantageously drawn into the secondary inlet of the compressor.

Figure 11:
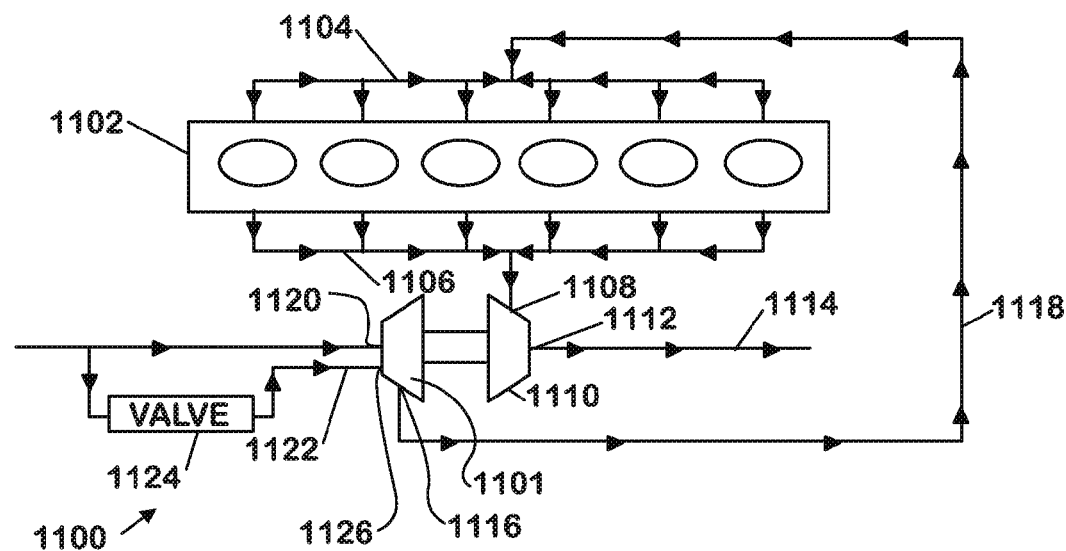
FIG. 11 is a block diagram of an engine having a secondary inlet air passage connected to an additional inlet of a compressor in accordance with the invention.

A block diagram for an engine 1100 having a compressor 1101 in accordance with the invention is shown in FIG. 11. The engine 1100 includes a crankcase 1102 connected to an intake manifold 1104 and an exhaust manifold 1106. Other engine components may be connected to the engine 1100 but are not shown for the sake of clarity. The exhaust manifold 1106 is connected to an inlet 1108 of a turbine 1110. The turbine 1110 may have an outlet 1112 connected to a low pressure exhaust passage 1114. The intake manifold 1104 is connected to an outlet 1116 of the compressor 1101 through an intake passage 1118. The compressor 1101 is connected to the turbine 1110 as is known. The compressor 1101 has a main inlet 1120 that may be connected to other engine components, for example an air-filter (not shown).

A secondary air inlet passage 1122 that includes an air control valve 1124 may fluidly connect the main inlet 1120 with a secondary inlet 1126 of the compressor 1101. The secondary inlet 1126 of the compressor 1101 may be arranged to provide a secondary path for air to enter the compressor 1101 and ingest intake air when the engine 1100 is operating and while the air control valve 1124 is at least partially open. Air ingested through the secondary inlet 1126 may advantageously be compressed and mixed in the compressor 1101 with air coming into the engine 1100 through the main inlet 1120 of the compressor 1101.

Alternatively, at certain engine operating conditions when the compressor 1101 is close to a surge condition, air in the passage 1122 may flow in a direction opposite than the one shown in FIG. 11; in this condition, air may flow from the secondary inlet 1126 back into the intake passage and the main inlet 1120 and advantageously operate as a recirculation passage. When the compressor 1101 operates close to a choke condition the air control valve 1124 may be open to allow an additional flow of air to enter the compressor 1101 through the secondary inlet 1126. During times when the compressor 1101 operates away from a choke or a surge condition, the air control valve 1124 may be closed, or may be partially open.

Figure 12:
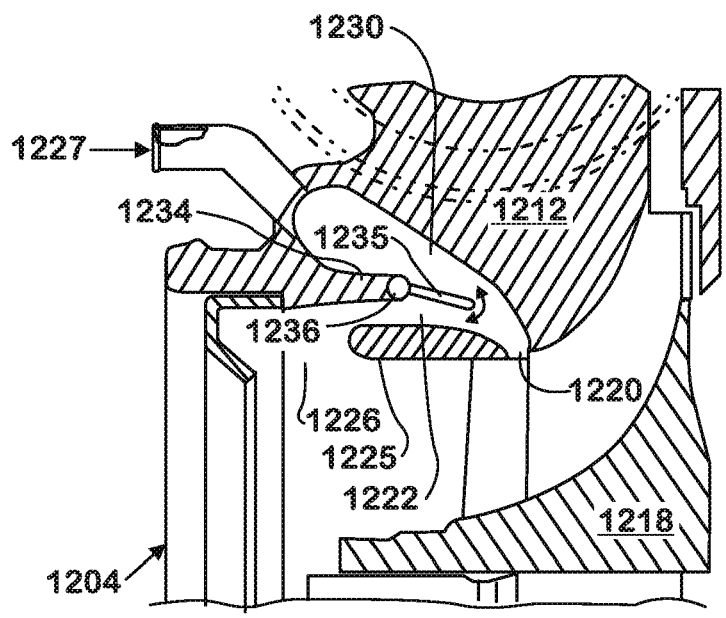
FIG. 12 is a cross section of a compressor having selectable secondary inlet passages in accordance with the invention.

An alternative embodiment of a compressor 1204 is shown in FIG. 12. The compressor 1204 has a housing 1212 enclosing a compressor wheel 1218. The housing 1212 in the area of the wheel 1218 has features that can selectively provide additional inputs to the compressor 1204. A secondary inducer slot 1220 fluidly connects a first secondary inlet passage 1222 with a first secondary inlet slot 1226 and functions as an enlargement or augmentation of a main inducer bore 1225 when the compressor 1204 operates, by allowing an additional mass flow of air to selectively access the compressor wheel 1218. A second secondary inlet passage 1230 with a secondary inlet port 1227 is selectively fluidly connectable to the secondary inducer slot 1220. The first secondary inlet passage 1222 is separated from the second secondary inlet passage 1230 in part by a wall 1234, and in part by a movable valve member 1235.

The valve member 1235 may be rotateably connected to the wall 1234 by a shaft member 1236. The valve member 1235 can advantageously rotate about the shaft 1236, as denoted by the curved arrows, thus enabling a selective fluid connection to be made between the slot 1220 and the first secondary inlet passage 1222, or the second secondary inlet passage 1230, or both. A rotation of the member 1235 on the shaft 1236 may be accomplished by an external actuator (not shown) that is arranged to selectively rotate the shaft 1236. In this embodiment, a flow entering the compressor wheel 1218 through the slot 1220 may advantageously be a portion of air from the main inducer bore 1225, or a fluid entering the compressor 1204 through the secondary inlet port 1227, or a combination thereof. For example, if the valve member 1235 is at the position thereof shown in FIG. 12, a mixture of fluids reaching the compressor wheel 1218 may include air entering the compressor 1204 through the main inlet bore 1225, an additional flow of air passing through the first secondary inlet passage 1222 when, for example, the compressor 1204 is operating close to a choke condition, and a portion of a fluid, for example exhaust gas being recirculated, that is entering the compressor 1204 through the secondary inlet port 1227.

Figure 13:
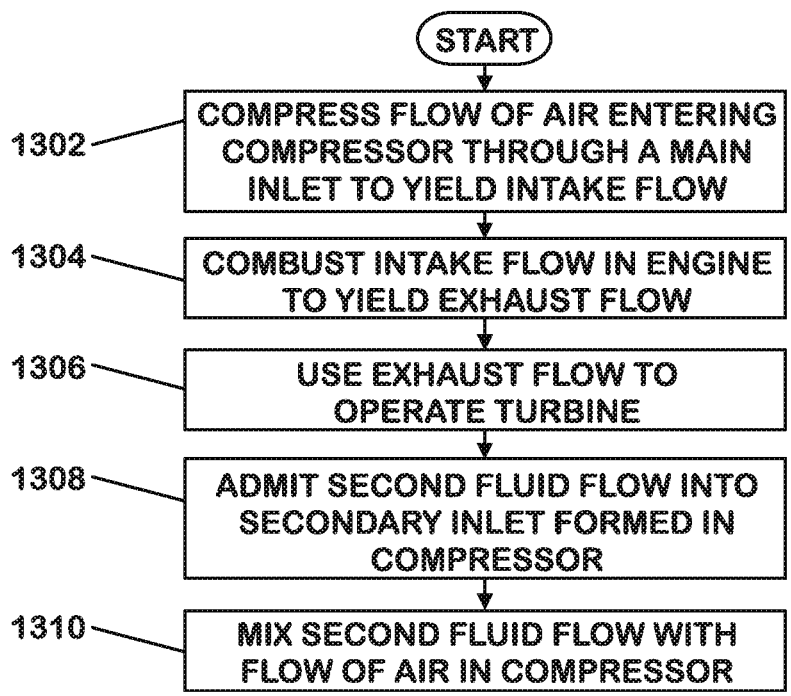
FIG. 13 is a flowchart for a method of operating an internal combustion engine in accordance with the invention.

A flowchart for a method of operating an internal combustion engine is shown in FIG. 13. A flow of air entering a compressor through a main inlet may be compressed to yield an intake flow at step 1302. The intake flow may be combusted within a plurality of cylinders included in an engine to yield an exhaust flow at step 1304. The exhaust flow may be used to operate a turbine at step 1306. A second fluid flow may be admitted into the compressor through a secondary inlet that is formed on the compressor, as described above, at step 1306. The flow of air entering the compressor through the main inlet and the second fluid flow entering the compressor through the secondary inlet may be mixed so that the second fluid flow is a portion of the intake flow, at step 1310.

Other steps in the method may also include recirculating an exhaust gas flow through an exhaust gas passage connecting an outlet of the turbine with the secondary inlet of the compressor, such that the second fluid flow is exhaust gas. Another step may include recirculating a crankcase vapor flow through a crankcase vapor passage connecting an internal cavity of the engine with the secondary inlet of the compressor, such that the second fluid flow is crankcase vapor. Another step may include passing a portion of the flow of air through a secondary air inlet passage connecting an inlet passage of the compressor with the secondary inlet of the compressor, such that the second fluid flow is air. Moreover, a third fluid flow may be admitted into an additional secondary inlet of the compressor.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A compressor assembly comprising:
   a compressor housing having a main air inlet and an annular wall defining an inducer bore;
   a secondary inlet passage disposed around the inducer bore, the secondary inlet passage having an inlet slot operatively intersecting the inducer bore to permit a fluid entering the secondary passage through an inlet port to enter the inducer bore, wherein the inlet slot defines an augmented inducer diameter region;
   a compressor wheel disposed in the compressor housing and having a stepped portion formed by at least one of a plurality of vanes;
   wherein the stepped portion is disposed in the augmented inducer diameter region adjacent to the inlet.

2. The compressor assembly of claim 1, wherein the secondary inlet passage is at least one of partially, selectively, and completely fluidly isolated from the main air inlet.

3. The compressor assembly of claim 2, further comprising an additional secondary inlet passage having an additional inlet slot and an additional inlet port, wherein an additional augmented inducer diameter is formed by the additional inlet slot.

4. The compressor assembly of claim 1, wherein an additional inlet port of an additional secondary inlet passage is in fluid communication with a fluid source that is external to the compressor assembly, and the additional secondary inlet passage has an additional inlet slot operatively intersecting the inducer bore to provide an additional augmented inducer diameter region.

5. The compressor assembly of claim 4, wherein each inlet port is in fluid communication with a respective external fluid source.

6. The compressor assembly of claim 1, further comprising an additional secondary inlet passage having an additional inlet port, and a valve member disposed to control communication of the inlet slot with the secondary inlet passages.

7. The compressor assembly of claim 1, further comprising an annular cavity disposed substantially around the inducer bore, wherein the annular cavity has an outlet side, and wherein the outlet side forms the inlet slot.

8. The compressor assembly of claim 7, further comprising a secondary inlet port in fluid communication with the annular cavity.

9. The compressor assembly of claim 1, wherein the inlet slot is arranged for entry of a secondary flow of fluid into the compressor wheel along an axial direction, wherein the axial direction is substantially parallel with a centerline of the inducer bore.

10. The compressor assembly of claim 1, wherein the inlet slot is arranged for entry of a secondary flow of fluid into the compressor wheel along a radial direction, wherein the axial direction is substantially perpendicular to a centerline of the inducer bore.

* * * * *